United States Patent [19]

Cronin et al.

[11] Patent Number: 5,277,986

[45] Date of Patent: Jan. 11, 1994

[54] METHOD FOR DEPOSITING HIGH PERFORMING ELECTROCHROMIC LAYERS

[75] Inventors: John P. Cronin; Daniel J. Tarico; Anoop Agrawal; Raymond L. Zhang, all of Tucson, Ariz.

[73] Assignee: Donnelly Corporation, Holland, Mich.

[21] Appl. No.: 914,435

[22] Filed: Jul. 15, 1992

[51] Int. Cl.$^5$ .................. B32B 15/00; B32B 17/06
[52] U.S. Cl. .................. 428/432; 427/108; 427/126.2; 427/126.3; 427/126.5; 427/126.6; 427/164; 427/165; 428/469; 428/702
[58] Field of Search .................. 427/108, 110, 126.2, 427/126.3, 126.5, 226, 126.6, 164, 165; 428/432, 469, 702

[56] References Cited

U.S. PATENT DOCUMENTS

| | | | |
|---|---|---|---|
| 3,806,229 | 4/1974 | Schoot et al. | 252/408 X |
| 4,490,227 | 12/1984 | Bitter | 427/109 X |
| 4,568,578 | 2/1986 | Arfsten et al. | 427/108 X |
| 4,712,879 | 12/1987 | Lynam et al. | 350/357 |
| 4,855,161 | 8/1989 | Moser et al. | 427/108 |
| 4,959,247 | 9/1990 | Moser et al. | 427/126.6 |
| 4,996,083 | 2/1991 | Moser et al. | 427/108 |

OTHER PUBLICATIONS

Brinker, C. J. and Scherer, G. W., *Sol-Gel Science: The Physics and Chemistry of Sol-Gel Processing*, Academic Press, Boston (1990).
Hench, L. L. and Ulrich, D. R. (eds.), "Use of Drying Control Chemical Additives (DCCAs) in Controlling Sol-Gel Processing," *Science of Ceramic Chemical Processing*, Wiley, New York (1986), p. 52.
Hench, L. L.; Orcel, G. and Nogues, J. L., "The Role of Chemical Additives in Sol-Gel Processing," *Mat. Res. Soc. Symp. Proc.*, 73 (1986) 35.
Machida, K., "Structural and Electrochromic Properties of Tungsten and Molybdenum Trioxide Electrodes in Acidic Media," *J. Electrochem. Soc.*, 137 (1990) 1169.
Joo, Seung-Ki; Raistrick, J. D. and Huggins, R. A., "Rapid Anisotropic Diffusion of Lithium in Electrochromic Thin Films Based on Hexagonal Tungsten Bronze Structure," *Solid State Ionics*, 17 (1985) 313.
Hitchman, M. L., "Proton Diffusion in Hydrogen Tungsten Bronzes," *Thin Solid Films*, 61 (1979) 341.
Randin, J. P. and Viennet, R., "Proton Diffusion in Tungsten Trioxide Thin Films," *J. Electrochem. Soc.*, 129 (1982) 2349.
Arnoldussen, T. C., "A Model for Electrochromic Tungstic Oxide Microstructure and Degradation," *J. Electrochem. Soc.*, 128 (1981) 117.
Randin, J. P., "Chemical and Electrochemical Stability of $WO_3$ Electrochromic Films in Liquid Electrolytes," *J. of Electronic Materials*, 7 (1978) 47.

Primary Examiner—Michael Lusignan
Attorney, Agent, or Firm—Price, Heneveld, Cooper, DeWitt & Litton

[57] ABSTRACT

An electrochromic coating is produced by adding an organic moiety to a solution of an electrochromic precursor, said organic moiety having a decomposition temperature greater than, or a vapor pressure sufficiently low at, the temperature at which solution solvent is removed, such that said organic moiety remains integral with the electrochromic precursor coating on said substrate after said solvent evaporates, and said organic moiety having a decomposition temperature lower than, or a vapor pressure sufficiently high at, the temperature at which said electrochromic precursor coating is converted to an electrochromic coating that said moiety is substantially removed from said coating before or during said conversion.

38 Claims, 2 Drawing Sheets

METHOD FOR DEPOSITING HIGH PERFORMING ELECTROCHROMIC LAYERS

BACKGROUND OF THE INVENTION

This invention relates to methods of making optical quality coatings of inorganic oxides on glass or equivalent substrates, such as metals or ceramics. These inorganic oxide coatings are primarily electrochromic, but may also have other desirable properties such as electrical conductivity and anti-reflection. Electrochromic films undergo reversible coloration induced by an applied electric field or current. These inorganic electrochromic layers can be broadly classified into those that color cathodically due to the double injection of electron and cation (Group VI-B oxides such as $WO_3$ and $MoO_3$) and those that color anodically (Group VIII oxides such as $IrO_2$, $Rh_2O_3$, NiO and CoO). Electrochromic coatings are used in information display devices, solar control windows and light modulators.

In a typical electrochromic device, the electrochromic coatings are in contact with an electron conductor and an ion conductor. The electron conductor can be a paste or coating on a substrate, or a stand-alone monolith. The ion conductor, or electrolyte, may be a liquid, paste or solid. Electrochromic coatings work by the injection or ejection of ions and electrons between the electron conductor and the ion conductor.

The most common way to deposit electrochromic films is by vacuum techniques, typically evaporation or sputtering. Non-vacuum techniques such as anodization and atmospheric chemical vapor deposition are also used. Evaporation deposition and sputter coating require a high vacuum. While such techniques require expensive capital equipment, they have been commonly used to produce electrochromic coatings.

Three similar non-vacuum coating techniques which have been used to a limited extent for electrochromic coatings are dip coating, spray coating and spin coating. These wet chemical solution coating techniques offer the advantage of being less capital intensive and thus less expensive. Dip coating, as an example, is commonly used to coat glass with $SiO_2$. This process involves lowering a glass substrate into a solution containing an appropriate precursor of the desired oxide. Spin coating and spray coating are similar to dip coating except that instead of dipping the glass, the precursor solution is applied to the glass, which is spun to spread the coating out, or is sprayed onto heated glass.

It is desirable to be able to achieve amorphous electrochromic coatings that are resilient to ionic intercalation such as occurs when ions such as hydrogen ions, lithium ions, sodium ions and the like are inserted and removed during electrochromic coloring and bleaching. It is also desirable to achieve amorphous electrochromic coatings that are durable to mechanical abrasion, chemical attack (as for example by acidic electrolytes) and the like.

One way to achieve such coatings is to consolidate the amorphous structure by heating to high temperatures and in some cases even crystallizing the tungsten oxide. Unfortunately, the less expensive wet chemical deposited films above a certain thickness (2,500 angstroms or thereabouts) usually crack during consolidation and crystallization due to volumetric shrinkage, among other effects. While thinner wet chemical deposited films are not as likely to crack during consolidation or crystallization, they do not color as deeply as thicker films.

In addition, when crystallization occurs in wet chemical deposited films, the coloration kinetics of the film becomes slower and/or its ability to color reduces. This is due to a decreased ionic diffusion and may also be related to the potential loss of coloration sites.

SUMMARY OF THE INVENTION

In this invention, the difficulties indicated above are overcome by using wet chemical deposition to form electrochromic films with a porous microstructure which allows fast diffusion of ions and also provides many surface sites for coloration. This is accomplished by coating the substrate with an electrochromic precursor solution which includes a removable moiety. The solvent, moiety and electrochromic precursor are selected such that the solvent is preferentially removed from the coating in a first removal step, leaving a matrix film of the electrochromic precursor and the moiety. In turn, the moiety is preferentially removed from the matrix in a second removal step prior to, or during, conversion of the electrochromic precursor to an electrochromic material.

This invention encompasses methods to allow film thickness to be much higher without physical degradation (such as cracking and lifting off the substrate). Higher film thickness enables higher optical attenuation from the devices, resulting in reduced light transmission and better contrast. Because the films of this invention have a porous structure, even when fired at elevated temperatures such as 150° C., or higher, volumetric strain also is reduced when ions diffuse through them during the coloration and bleach process, thus extending their cyclability.

DESCRIPTION OF THE PREFERRED EMBODIMENT

Figure 1:
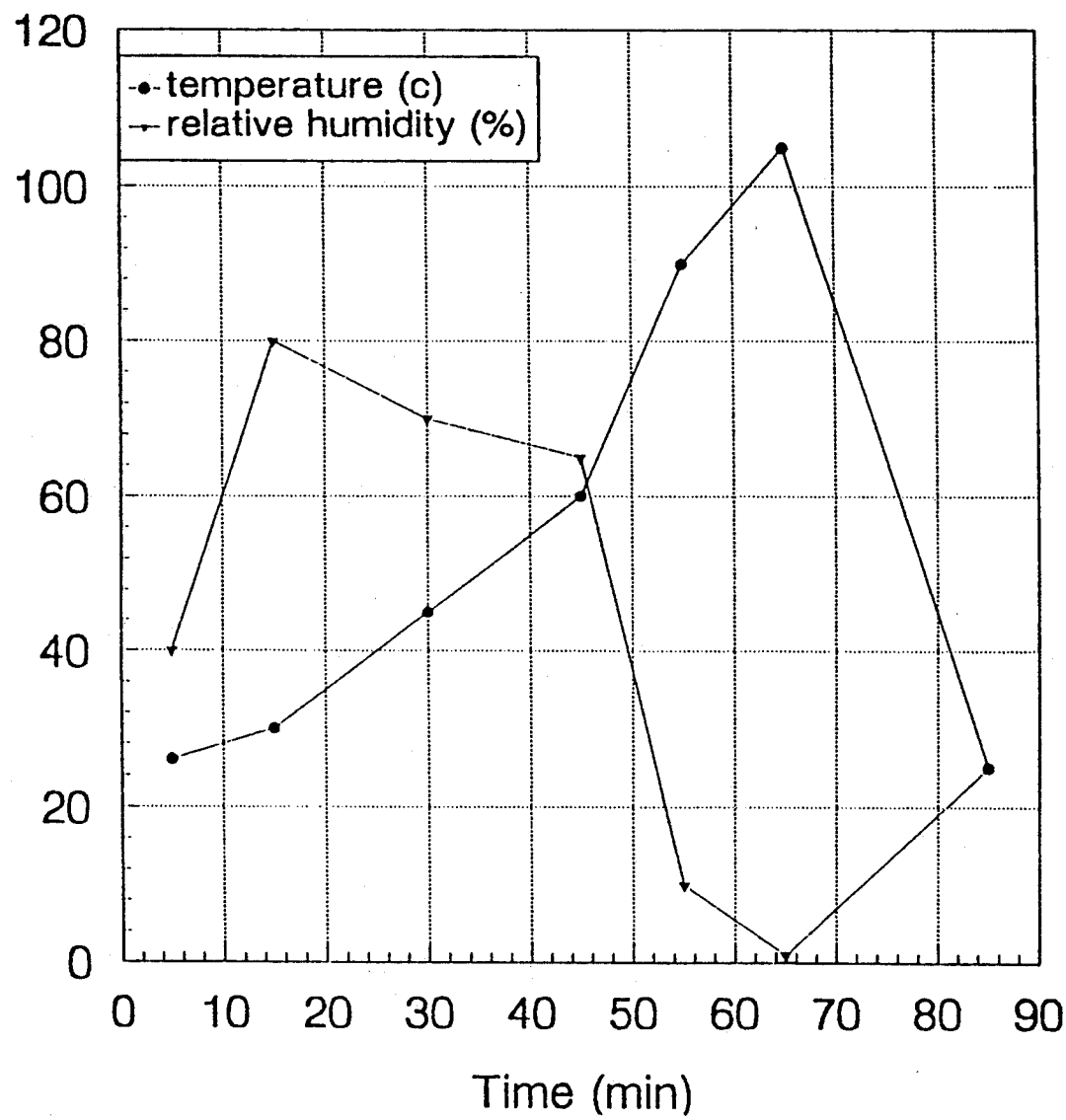
FIG. 1 plots a humid atmosphere regimen for pretreating precursor solution coatings on conductive substrates.

While the present invention contemplates various types of electrochromic precursors and electrochromic coatings, and, accordingly, various types of conversion processes, the preferred embodiment electrochromic precursor is one which is converted to an electrochromically-active metallic oxide at elevated temperatures. Similarly, while a variety of techniques may be used to remove solvent from the precursor/moiety solution, the preferred embodiment first removal step involves evaporation in vacuum and/or heating to a temperature sufficiently high to remove solvent, but below the temperature at which the moiety might be removed and below the temperature at which the electrochromic precursor would be converted to an electrochromically-active metallic oxide. Similarly, the preferred second removal step comprises further heating of the precursor/moiety matrix to the precursor conversion temperature.

To assure the ultimate proper formation of a porous microstructure, the moiety must substantially remain in the as-deposited coating while the solvent is removed therefrom. Thus, the moiety must have a decomposition temperature sufficiently high, or vapor pressure sufficiently low, at the temperature and/or vacuum at which the precursor solution solvent evaporates, so that the moiety molecules are integral with the precursor coating which is formed as the precursor solution solvent evaporates. The moiety and precursor form an immobile matrix film after the solvent has evaporated.

On the other hand, the moiety must have a decomposition temperature sufficiently low, or a vapor pressure sufficiently high, at the temperature at which the electrochromic precursor is converted to an electrochromically-active metallic oxide, so that the moiety is substantially removed by decomposition or evaporation or both prior to, or generally during, conversion of the electrochromic precursor to the electrochromically-active metallic oxide.

A substrate with a conductive surface is preferably dipped into the precursor solution and withdrawn at a rate sufficient to give a coating of the desired thickness over the conductive surface, though spray or spin coating or equivalent wet chemical deposition means can be used in the broader aspects of the invention. The coating is then dried at room temperature or elevated temperature to remove the solvent and is preferably fired in an oven to complete the condensation and hydrolysis to yield an electrochromic oxide coating having exceptional electrochromic properties and stability.

Various types of precursor solutions for electrochromically-active metallic oxides are known and are useable in the broader aspects of this invention. The preferred metallic oxide precursor solution is prepared by reacting a transition metal with a solution of a mixture of hydrogen peroxide and an organic acid, or sequentially reacting the hydrogen peroxide with the metal and then reacting the product with an organic acid. The reaction product is filtered and the filtrate preferably is evaporated to dryness under reduced pressure. The resulting transition metal-peroxy acid product (liquid or powder) is then reacted at room temperature by mixing with a lower carbon alcohol to form a transition metal-peroxyester derivative. This solution can be used for dipping, but preferably the transition metal-peroxyester derivative is isolated by removing excess alcohol under vacuum. This peroxyester-transition metal derivative, when dissolved in a suitable carrier solvent, constitutes the preferred dipping solution.

The reaction between the transition metal, hydrogen peroxide and organic acid is conducted at a temperature controlled at about $-10°$ C. to about $12°$ C. The ingredients are then allowed to react at that temperature from about 16 to about 26 hours. After the reaction, the reaction product is filtered to remove the solids from the filtrate. The filtrate is then refluxed for about 10 to about 18 hours at from about $45°$ C. to about $60°$ C. and then refiltered. This second filtrate is usually dried to recover the transition metal-peroxy acid product as a powder. The transition metal-peroxy acid product (liquid or powder) is then reacted at room temperature with an alcohol in a flask loaded with a stir bar. The reaction temperature can vary from around $22°$ C. to around $55°$ C., and the reaction time can vary from about 30 hours to about one-half hour, depending on temperature. Preferably, the peroxyester-transition metal derivative is stored long-term at below $10°$ C.

Typical transition metals which can be used as starting materials include those of tungsten, molybdenum, manganese, chromium, rhenium, iridium, nickel and others. The peroxyester derivatives of these transition metals can be used separately or mixtures of them can be used to form electrochromic coatings. In addition, the peroxyester derivatives of these transition metals can be mixed with peroxyester derivatives or peroxy acid products of other transition metals or of non-transition metal oxides, such as silica and titanium dioxide, to form electrochromic coatings. Mixtures of transition metal peroxyester derivatives form electrochromic coatings having enhanced color efficiency. Mixtures of a transition metal-peroxyester derivative and a non-transition metal-peroxy acid product or a non-transition metal-peroxyester derivative form electrochromic coatings having enhanced durability.

The electrochromic precursors can be prepared in several different ways to yield mixed electrochromically-active metallic oxide coatings. A second metal can be reacted with hydrogen peroxide and an organic acid to form a second transition metal-peroxy acid product, which can then be mixed with a peroxyester-transition metal derivative to form a peroxyester-transition metal/second metal-peroxy acid mixture. Alternatively, the second metal-peroxy acid product can be reacted with a lower carbon alcohol to form a peroxyester-second metal derivative prior to mixing with another peroxyester-transition metal derivative.

The peroxide used for forming the peroxy acid product is typically hydrogen peroxide. It is contemplated, however, that other peroxides can be utilized such as peroxyacetic acid and 3-chloroperoxybenzoic acid.

Organic acids are used for forming the peroxy acid product. While a variety of organic acids are operable, the most preferred organic acids are acetic acid and propionic acid.

The preferred lower carbon alcohols added to the transition metal-peroxy acid product are methanol, ethanol, propanol, isopropanol, and mixtures thereof, although butyl and pentyl alcohols are broadly operable. These same alcohols can be used as carrier solvents for the precursor solution. Other carrier solvents include tetrahydrofuran, diethyl ether and other equivalents thereto. They should evaporate readily, i.e. at temperatures lower than $100°-120°$ C. such that an electrochromic precursor and moiety matrix coating are readily formed by evaporating the carrier solvent.

Preferred removable moieties are organic compounds such as lower carbon acids such as oxalic, malonic, succinic, glutaric and adipic acids, lower carbon bases such as formamide and higher boiling lower carbon alcohols such as glycerol. The organic moiety must have a decomposition temperature sufficiently greater than the temperature at which the carrier solvent is removed, or must have a vapor pressure sufficiently low at the temperature at which the carrier solvent is removed, that its molecules remain integral with the precursor coating which is formed as the solvent evaporates to form a precursor/organic moiety matrix and to assure the ultimate proper formation of a porous microstructure. It is also necessary, however, that the organic moiety have a decomposition temperature less than or equal to the "firing" or "curing" temperature at which the precursor coating is substantially converted to an electrochromic coating, or have a vapor pressure sufficiently high at or below the conversion temperature so that decomposition or evaporation of the organic moiety occurs prior to or concurrently with the establishment of the metallic oxide structure.

The metallic oxide structure is typically established at temperatures of from about $150°$ C. to about $400°$ C. with $250°$ C. to $400°$ C. being most typical. In general, it is preferable that the organic moiety, if solid, should have a melting point of 50° C. and, preferably, at least 100° C., and if non-solid, have a boiling point at 760 torr of at least 120° C. The selection of a low carbon content organic moiety is important especially for the moieties which decompose to non-volatile residues, because entrapment in the oxide structure of too much foreign material such as carbon or equivalent residues can affect the optical quality, disturb the refractive index, and cause the deterioration of a variety of physical, chemical or functional properties of the electrochromic coating. Moieties of six carbon atoms or less are most preferred.

Examples of organic moieties which are operable, along with their respective boiling points or melting points are set forth below:

| ORGANIC MOIETY | MELTING POINT |
| --- | --- |
| Oxalic acid | 190° C. |
| Oxalic acid dihydrate | 104–106° C. |
| Malonic acid | 135–137° C. |
| Succinic acid | 187–189° C. |
| Glutaric acid | 95–98° C. |
| Adipic acid | 152–154° C. |
| Ethylene diamine tetra-acetic acid | 250° C. |
| | BOILING POINT |
| Glycerol | 290° C. at 760 torr |
| Formamide | 210° C. at 760 torr with partial decomposition at 180° C. |

For electrochromic applications, the substrate which is to be coated with the organic moiety containing electrochromic coating itself should have a conductive surface. Good conductivity is important to achieving a fast response time and uniform coloration in the electrochromic coating. In the case of glass or ceramic substrates, such conductivity at the surface can be achieved by applying a conductive coating prior to the electrochromic coating. Preferably, this coating has a sheet resistance of less than 10 ohms per square.

In glass applications where one should be able to see through the glass and the conductive coating, it is important that the conductive coating be very thin so that light transmission is not excessively inhibited. In order to achieve a sheet resistance of less than about 10 ohms per square and still have a coated piece of glass with a light transmission of 85% or greater, the material used to create the conductive coating should have a specific resistivity of less than about $8 \times 10^{-4}$ ohm centimeters, and most preferably, less than about $4 \times 10^{-4}$ ohm centimeters. Indium tin oxide coatings (ITO) can be achieved which have a specific resistivity of about $2 \times 10^{-4}$ ohm centimeters. ITO is the most preferred coating material for glass, ceramic or equivalent substrates which themselves are nonconductive. Alternative transparent conductive coatings which could also be used are doped oxides of tin and zinc, and cadmium stannate.

The electrochromic precursor is dissolved in the carrier solvent at a concentration of from about 5% to about 60% by weight. The molar ratio of organic moiety to electrochromic precursor preferably falls within a range of from about 0.1:1 to about 2:1, and most preferably from about 0.3 to about 1:1. While the corresponding weight percent of organic moiety in solution will vary with molecular weight of the moiety, it will typically be less than 10 weight percent and more typically between about 2 and 5 weight percent.

Upon incorporation of the organic moiety to form the working solution, the coating can be deposited on the substrate by spin, dip or equivalent means. In the case of dipping, the substrate is dipped into the solution and slowly withdrawn. The thickness of the coating is a function of the withdrawal rate and the viscosity of the dipping solution as shown in Equation 1.

$$t = \left( \frac{2V_s n}{dg} \right)^{\frac{1}{2}}$$

Where:
t = coating thickness
$V_s$ = withdrawal rate
n = viscosity
d = coating density
g = gravitational constant The coating thickness can be varied over a wide range merely by regulating the withdrawal rate, dipping solution concentration and the viscosity of the dipping solution. Removal rates of between about 8 to 50 centimeters per minute and solution concentrations between about 10 and 15 weight percent yield coatings of from 200 to 10,000 angstroms.

The as-deposited coating is converted to an electrochromically-active coating by removal of the volatile solvent to form a precursor/moiety matrix, followed by removal of the moiety and hydrolysis, condensation and similar reactions to convert the precursor to an electrochromically-active film. Decomposition or evaporation of the organic moiety occurs at a temperature higher than that required for removal of the volatile solvent but at a temperature less than or equal to the temperature at which the oxide structure is substantially established. The coated substrate is gradually heated from room temperature to the conversion temperature (about 100° C. to 250° C. or thereabouts, if an amorphous end product is desired, above about 350° C. if a crystallized end product is desired) at a rate of 10° C. per minute or lower, preferably about 5° C. per minute. Firing is preferably allowed to proceed for about 15 to about 120 minutes. Different metallic oxide coatings will require differing firing conditions, as will be appreciated by reference to the examples herein. Alternatively, the as-desposited coating can be placed in a vacuum, or exposed to a flow of inert gas such as nitrogen or argon or the like, to remove the carrier solvent, followed by heat treatment at elevated temperatures to ultimately form the desired oxide structure.

It has been surprisingly found that an especially enhanced network formation can be obtained by first gradually heating the coated substrate from room temperature to about 100° C. in a humid atmosphere where the relative humidity throughout the heat treatment is at least 20% relative humidity (%RH). The substrate is brought to this temperature at a rate of 10° C. per minute or lower, preferably about 5° C. per minute, and held at about 80° C. to 120° C., with about 100° C. preferred for about 30 to 120 minutes with about one hour preferred. After completion of this step, the coated substrate is allowed to cool back to room temperature and is then gradually heated in ambient atmosphere as described above to the desired "curing" or "firing" temperature (from about 150° C. to about 400° C.) at which the electrochromic precursor is converted to an electrochromic metallic oxide coating. We find that such a curing regimen incorporating a pretreatment step of purposefully preheating in a substantially humid atmosphere enables ultimate achievement in a single dip or slurry application of high performing, crack-free, high quality coatings of thickness 2,500 angstroms or greater.

Although use of organic moieties to control microstructure in sol-gel created bulk structures is known, the benefits to electrochromic performance in thin-film electrochromic coatings achieved by the use of the organic moieties of desired high decomposition temperatures and low carbon content has hitherto not been known in the art. Nor have the benefits of a pretreatment step of drying in a humid atmosphere in combination with use of organic moieties in forming electrochromic thin-film coatings been previously known in the art.

It has also been found that the electrochromic layers deposited in accordance with the present invention can be protected against environmental degradation, as for example by exposure to acid and basic media, by using a tantalum pentoxide overlayer. The tantalum pentoxide overlayer also serves as an electrolyte layer for protons between two electrochromic materials. Similarly, a lithium ion conducting overlayer coating could be deposited on top of the $WO_3$ layer for those electrochromic devices that work by reversible insertion/extraction of $Li^+$ ions.

The following Examples illustrate the preparation of preferred coating solutions:

EXAMPLE 1

Dipping solutions were prepared as follows: Forty (40) milliliters of deionized water was placed in a one liter pear-shaped flask loaded with a stir bar. The flask was placed in an ice bath with 800 milliliters of a 1:1 solution of hydrogen peroxide (31 volume percent) and glacial acetic acid. When the mixture equilibrated to the bath temperature, 65 grams of tungsten metal was added to the mixture and the mixture was allowed to react for 24 hours and the remaining solids removed by filtering. This liquid was refluxed for 18 hours at 55° C. The solution was dried under vacuum to recover powdered tungsten peroxy acid product. Fifty (50) grams of this powder was reacted with 250 milliliters dry ethanol. The solution was filtered and the solids isolated by removing solvents under reduced pressure. The resulting tungsten peroxyester derivative is a yellow powder which is soluble in ethanol and decomposes at temperatures greater than 10020 C. Thirty-one (31) grams of the tungsten peroxyester derivative was redissolved in 70 milliliters of ethanol to prepare a dipping solution. Ethanol has a boiling point of about 78° C. at 760 torr.

The dipping solution was divided in half and to one half was added the organic moiety oxalic acid dihydrate in five weight percent. Oxalic acid dihydrate has a melting point of about 104° C. to 106° C. Indium tin oxide (ITO)-coated substrates were lowered in air at room temperature and atmosphere into each of the two solutions respectively prepared above and coated by withdrawing at different speeds. For the solution with oxalic acid dihydrate, the withdrawal rate was four centimeters per minute, and for the solution without oxalic acid dihydrate, the rate was eight centimeters per minute. The coatings were 2,000 angstroms thick. A pretreatment step of firing in a substantially humid atmosphere was then conducted on the coated substrates in accordance with the temperature/relative humidity versus time regimen schematically illustrated in FIG. 1. Both of the samples were then cut into two halves, one of which was fired to 250° C. (amorphous), and the other to 350° C. (crystalline) in an oven in ambient atmosphere for about 60 minutes. The coatings were colored in 0.01N $H_2SO_4$ using −0.4 volts to color and +0.4 volts to bleach with a Ag/AgCl reference electrode. The color kinetic data at 550 nanometers for the different coatings is tabulated in Table 1 (550 nanometers is the wavelength at which the human eye is most responsive). As can be seen from the table, the addition of oxalic acid dihydrate to the dipping solution enhances the rate of coloring and bleaching for both the amorphous and crystalline coatings.

TABLE 1

Tabulated data for the coloring kinetics at 550 nanometers of $WO_3$ films from ethanol dipping solutions of tungsten peroxyester derivative, with and without oxalic acid dihydrate. The films on ITO were colored in 0.01N $H_2SO_4$ using Ag/AgCl as the reference electrode.

| Dipping Solution | Firing Temp. °C. | Color (Seconds) | | Bleach (Seconds) | |
|---|---|---|---|---|---|
| | | $T_{50}$ | $T_{90}$ | $T_{50}$ | $T_{90}$ |
| No oxalic acid dihydrate | 250 | 44 | 201 | 15 | 48 |
| 5 wt % oxalic acid dihydrate | 250 | 13 | 46 | 3 | 6 |
| No oxalic acid dihydrate | 350 | $T_{50} >> 600$ | | Slow to bleach | |
| 5 wt % oxalic acid dihydrate | 350 | 17 | 51 | 61 | 41 |

$T_{50}$ = time for the coating transmission to change 50% of the total difference between the fully bleached and fully colored states.
$T_{90}$ = time for the coating transmission to change 90% of the total difference between the fully bleached and fully colored states.

EXAMPLE 2

Two spin coating solutions of tungsten peroxyester derivative were prepared as follows: (A) 25.8 grams of tungsten peroxyester derivative were dissolved in 100 milliliters of ethanol; (B) 37.1 grams of tungsten peroxyester derivative and 3.65 grams of oxalic acid dihydrate were dissolved in 100 milliliters of ethanol. The solutions were spin-coated onto ITO substrates. The sample (from solution A) without oxalic acid dihydrate was heated in ambient atmosphere to 250° C. for about 60 minutes at 5° C. per minute. The sample with the oxalic acid dihydrate dipped from solution B was pretreated as described in Example 1 and as illustrated in FIG. 1 prior to firing in ambient atmosphere to 250° C. Using solution A, crack-free coatings were obtained up to a thickness of 2,200 angstroms, whereas solution B gave crack-free coatings up to 3,700 angstroms.

EXAMPLE 3

Two dipping solutions of the tungsten peroxyester derivative were prepared by adding respectively 11 grams and 31 grams of the tungsten peroxyester derivative to 70 milliliters of ethanol and adding five weight percent oxalic acid dihydrate. An ITO-coated substrate was dipped into the lower concentration dipping solution and withdrawn at a rate of 27 centimeters per minute. The substrate was then divided in half. One-half was pretreated in a humid atmosphere as described in Example 1, and then heated to 250° C. for about 60 minutes under ambient atmosphere. The second half of the coated substrate was also heated, but without the humidity pretreatment step, to 250° C. for 60 minutes. Both coated substrates after the 250° C. firing had a 1,000 angstrom $WO_3$ coating which were crack-free and which had excellent electrochromic properties. The experiment was repeated exactly for the higher concentration dipping solution. In this case, after the 250° C. firing, the $WO_3$ coatings were 5,000 angstroms thick. However, the coating that had the humidity pretreatment step was crack-free and had excellent electrochromic properties, while the coating without the pretreatment step was substantially cracked and flaked off the substrate surface.

EXAMPLE 4

Forty (40) grams of tungsten peroxyester derivative and 7.69 grams of oxalic acid dihydrate were dissolved in 70 milliliters of ethanol. A $SnO_2$-coated glass substrate (10 ohm/square) obtained under the trade name TEC 10 TM from Libby Owens Ford, Toledo, Ohio was dipped into the solution and withdrawn at a rate of 46 centimeters per minute. The coating was pretreated as described in Example 1 and then heated in ambient atmosphere to 350° C. to give a crack-free coating which was 1.021 micrometers thick.

EXAMPLE 5

Thirty-one (31) grams of tungsten peroxyester derivative was dissolved in 80 milliliters of ethanol to form the dipping solution. Oxalic acid dihydrate was added to individual dipping solutions in the following concentrations:

| wt % oxalic acid dihydrate | molar ratio oxalic acid:tungsten peroxyester derivative |
|---|---|
| 0.0 | 0.0 |
| 0.5 | 0.092 |
| 1.0 | 0.184 |
| 2.0 | 0.369 |
| 5.0 | 0.922 |
| 10.0 | 1.84 |

Figure 2:
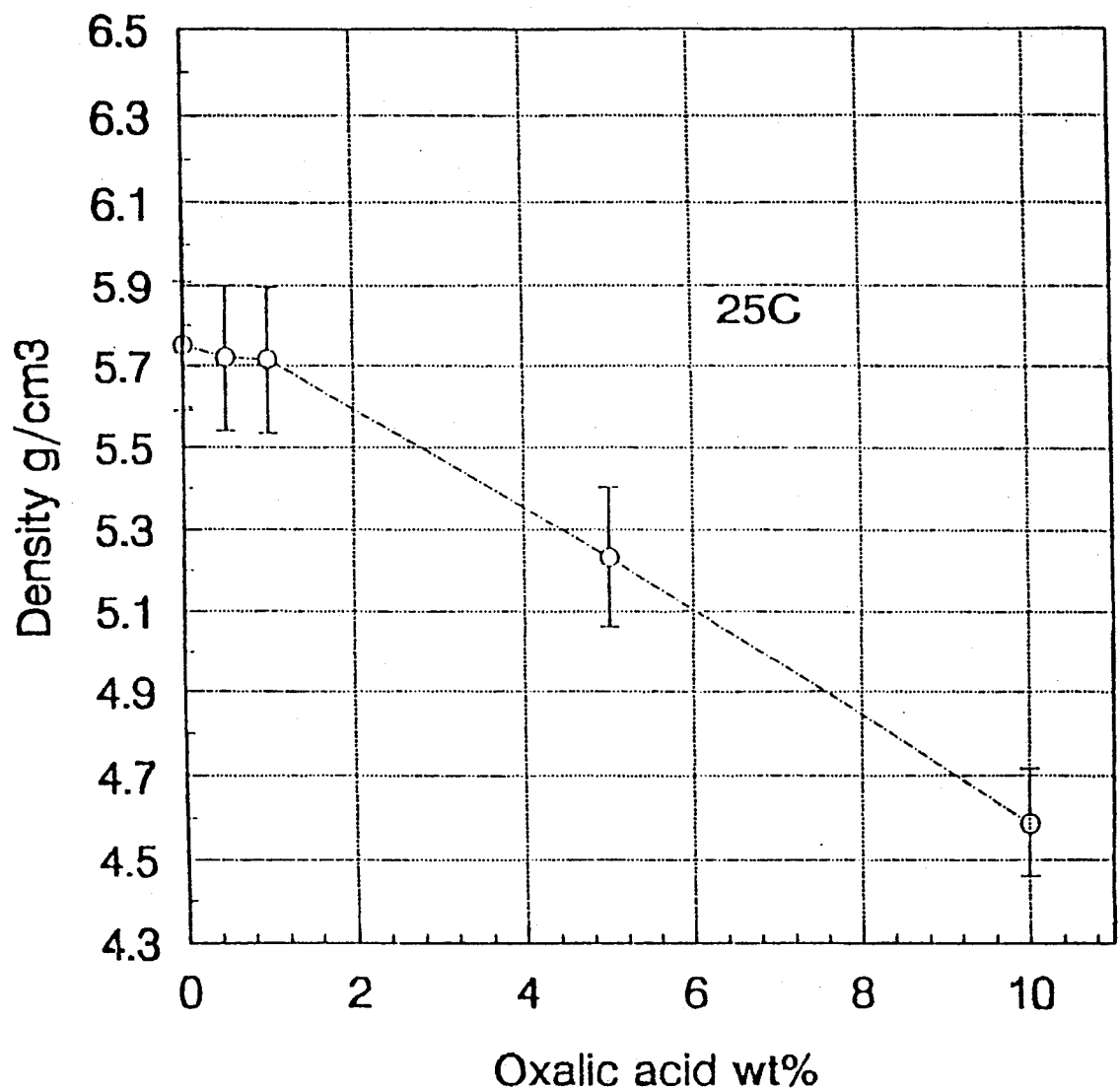
FIG. 2 plots after-firing film density against variation in film moiety concentration.

ITO-coated glass substrates were dipped into the solutions and withdrawn at a rate of 27 centimeters per minute. The resulting coatings were pretreated as described in Example 1 and then heated to 250° C. and their density determined using Rutherford Backscattering Analysis (see FIG. 2). As can be seen from this figure, adding oxalic acid dihydrate to the dipping solution allows one to control the density of the heat-treated film.

EXAMPLE 6

Dipping solutions were prepared as described in Example 1 and to these solutions were added the following organic acids in the molar ratio of 0.875 moles acid per mole of tungsten peroxyester derivative: oxalic acid dihydrate, malonic acid, succinic acid, glutaric acid, and adipic acid. These acids have the following melting points: oxalic - about 104°–106° C., malonic - about 135°–137° C., succinic - about 187°–189° C., glutaric - about 95°–98° C. and adipic - about 152°–154° C. The solutions were spin-coated onto ITO substrates at speeds such that coating thickness after pretreating as illustrated in FIG. 1 and firing to 350° C. in air was between 2,000 angstroms and 2,300 angstroms. The films were colored in 0.1N $H_2SO_4$ as in Example 2 and the results are summarized in Table 2. It was found that solutions with a more preferred moiety, oxalic acid, yielded crack-free films whereas those with higher molecular weight organic acids were cracked at lower thicknesses (less than 3,000 angstroms).

TABLE 2

Tabulated data for the coloring kinetics at 550 nanometers of $WO_3$ films from films produced with various organic acids. The films on ITO were colored in 0.1N $H_2SO_4$ using Ag/AgCl as the reference electrode.

| Acid | Carbon Atoms | Bleached Transmittance | Colored Transmittance | Color Time (Sec) |
|---|---|---|---|---|
| *Oxalic | 2 | 95.0 | 35.2 | 220 |
| Malonic | 3 | 83.0 | 68.1 | 245 |
| Succinic | 4 | 84.5 | 56.6 | 250 |
| Glutaric | 5 | 86.1 | 71.2 | 230 |
| Adipic | 6 | 85.7 | 72.6 | 200 |

*dihydrate

EXAMPLE 7

Tungsten peroxyester derivative solution was prepared as described in Example 1, except that two weight percent glycerol was added instead of oxalic acid. Glycerol has a boiling point of about 290° C. at 760 torr. The solution was spin-coated onto ITO-coated glass slides at spin rates of 3,000, 2,000 and 1,000 rpm and pretreated as described in Example 1 and heated to 250° C. The resulting coatings crack-free were 3,715, 4,360 and 6,400 angstroms thick.

EXAMPLE 8

Tungsten peroxyester derivative solution was prepared as described in Example 1, except that two weight percent formamide was added instead of oxalic acid dihydrate. Formamide has a boiling point of about 210° C. at 760 torr. ITO-coated glass substrates were spin-coated with the solution at spin rates of 3,000, 2,000 and 1,000 rpm respectively and pretreated as described in Example 1 and heated to 250° C. The resulting coatings crack-free were 3,550, 4,290 and 6,000 angstroms thick.

EXAMPLE 9

Three tungsten peroxyester derivative solutions were prepared as described in Example 3, except that the solvents used were methanol, 2-butanol and tetrahydrofuran. Methanol has a boiling point of about 65° C. at 760 torr. 2-butanol has a boiling point of about 99°–100° C. at 760 torr. Tetrahydrofuran has a boiling point of about 67° C. at 760 torr. The solutions were deposited onto ITO glass slides by spin coating at 1,250 rpm, pretreated as illustrated in FIG. 1 and heated to 250° C. The coating from the methanol solution was 7600 angstroms thick, and its luminous transmission in the bleached state was 80.4% and in the colored state 12.8%. From the 2-butanol solution the coating was 3650 angstroms thick, and its luminous transmission in the bleached state was 79.6% and in the colored state 33.4%. The coating from the tetrahydrofuran solution was 8,500 angstroms thick and in the bleached state its luminous transmission was 77.7% and in the colored state 10%.

EXAMPLE 10

Amorphous and crystalline $WO_3$ coatings were prepared from a dipping solution with and without five weight percent oxalic acid dihydrate as described in Example 1. The coatings were colored using $Li^+$ ions in a cell containing 0.01M lithium trifluromethanesulfonate in propylene carbonate, and a reference electrode $Ag/AgNO_3$ (0.01M in acetonitrile). The applied potential to color was $-1.5$ volts and to bleach 1.0 volts. The color kinetic data at 550 nanometers for the different coatings is tabulated in Table 3. As can be seen from the table for both amorphous and crystalline tungsten oxide colored by $Li^+$ ions, the rate of coloring and bleaching was enhanced by the addition of oxalic acid dihydrate. The charge capacity for the amorphous coating with and without oxalic acid dihydrate was 1,471 $C/cm^3$ and 1735 $C/cm^3$, respectively, and for the crystalline sample with oxalic acid was 1,672 $C/cm^3$.

TABLE 3

Tabulated data for the coloring kinetics at 550 nanometers of $WO_3$ films from ethanol dipping solutions of tungsten peroxyester derivative, with and without oxalic acid dihydrate. The films on ITO were colored in 0.01M Li $CF_3SO_3$/propylene carbonate using $Ag/AgNO_3$ as the reference electrode.

| Dipping Solution | Temp. °C. | Color (Seconds) | | Bleach (Seconds) | |
|---|---|---|---|---|---|
| | | $T_{50}$ | $T_{90}$ | $T_{50}$ | $T_{90}$ |
| No oxalic acid dihydrate | 250 | 47 | 154 | 97 | 316 |
| 5 wt % oxalic acid dihydrate | 250 | 36 | 124 | 54 | 99 |
| No oxalic acid dihydrate | 350 | 39 | 129 | Slow to bleach | |
| 5 wt % oxalic acid dihydrate | 350 | 59 | 171 | 100 | 294 |

$T_{50}$ = time for the coating transmission to change 50% of the total difference between the fully bleached and fully colored states.
$T_{90}$ = time for the coating transmission to change 90% of the total difference between the fully bleached and fully colored states.

EXAMPLE 11

Thirty-one (31) grams of tungsten peroxyester derivative, 5.95 grams of oxalic acid dihydrate and 0.178 grams of tin (IV) chloride pentahydrate was dissolved in 70 milliliters of ethanol. $SnO_2$-coated glass substrate (20 ohms/square) was dipped into the solution and withdrawn at a rate of 46 centimeters per minute and pretreated as illustrated in FIG. 1 and then heated to 350° C. The coating was 8,000 angstroms thick, and we found that addition of a tin dopant enhanced coating adhesion to the tin oxide substrate. In general, we find benefit from doping a thin film with a small amount of at least one of the principal metals compound coating being adhered to by the sol-gel deposited layer. In the bleached state, its luminous transmission was 84.9%, and in the colored state was 3.7%. The coating was placed in 0.1N $H_2SO_4$ along with a similar coating without the tin doping. After eight (8) hours, the $WO_3$ coating developed a hazy appearance, while the tin-doped $WO_3$ coating was unaffected by the acid up to a period of several weeks.

EXAMPLE 12

A tungsten oxide coating doped with rhenium was prepared as follows. Eight (8) grams of rhenium metal was reacted with a 500 milliliter 50:50 mixture of $H_2O_2$ (30 volume percent) and acetic acid at 0° C. The mixture was allowed to react for 90 minutes and slowly warmed to room temperature, and reacted for an additional 24 hours. The excess $H_2O_2$ and acetic acid were removed under reduced pressure at 60° C. to leave a yellow liquid of rhenium peroxy acid product. This complex is a liquid which is soluble in ethanol and decomposes at greater than 100° C. The complex was added to a tungsten peroxyester derivative dipping solution containing oxalic acid dihydrate as described in Example 1 such that the molar ratio of W to Re was 129.0. The solution was spin-coated at 1,100 rpm onto ITO-coated substrates and pretreated as illustrated in FIG. 1 and heated to 350° C. The coating thickness was 5,740 angstroms, and when colored using $H^+$ ions as described in Example 1, its optical density was 1.21.

EXAMPLE 13

A tungsten oxide coating doped with molybdenum was prepared as follows. Ten (10) grams of molybdenum metal was slowly added to 200 milliliters of a 50:50 mixture of $H_2O_2$ (30 volume percent) and glacial acetic acid at 0° C. The metal was completely oxidized after 40 minutes to give a clear solution. The mixture was filtered and evaporated to dryness to give an organic powder of a molybdenum peroxy acid product. This complex is a yellow solid which is soluble in ethanol and decomposes at greater than 100° C. This complex was added to a tungsten peroxyester derivative dipping solution containing oxalic acid dihydrate prepared as described in Example 1 such that the molar ratio of W/Mo was equal to 7.9. An ITO-coated glass substrate was dipped into the solution and withdrawn at a rate of 30 centimeters per minute. The coating was pretreated as illustrated in FIG. 1 and heated to 250° C. and had a thickness of 5000 angstroms. The coating was placed in a 0.1N $H_2SO_4$ acid bath, along with a similar coating without molybdenum doping. After eight (8) hours, the undoped coating developed a hazy appearance, while after two weeks, the molybdenum-doped coating was unaffected by the acid.

EXAMPLE 14

Thirty-one (31) grams of tungsten peroxyester and 5.96 grams of oxalic acid dihydrate were dissolved in 70 milliliters of dry ethanol to prepare a dip solution. A conductive coating of ITO on glass was lowered into the solution and withdrawn at a rate of nine centimeters per minute. The resulting coating was fired to 250° C. The coating thickness was 2,000 angstroms. The same was cut in two, and one half of the sample was further coated by tantalum oxide by the following process. Five milliliters of tantalum ethoxide was added under dry nitrogen to a flask containing 60 milliliters dry ethanol and 5.38 milliliters of 2,4-pentanedione. To enhance hydrolysis, 0.7477 milliliters of HCl was added to the solution. The solution was allowed to stir for 24 hours prior to coating. The tungsten oxide-coated substrate previously described was immersed in the solution and withdrawn at a rate of 27 centimeters per minute. The coating was then heated under ambient atmosphere at a rate of 5° C. per minute to 350° C., held at temperature for one hour, and cooled at 5° C. per minute to room temperature. This resulted in a clear layer of $Ta_2O_5$, 1,000 angstroms thick. Both of the samples were cycled in 0.01N sulfuric acid with an Ag/AgCl reference electrode. When −0.4 volts were applied (with respect to Ag/AgCl), the film colored from 75% to 35% transmission in 300 seconds at 550 nanometers without the tantalum overlayer, and colored from 90% to 64.8% transmission under the same conditions with the tantalum overlayer. The films were then immersed in 0.1N $H_2SO_4$. The film without the tantalum oxide overlayer was dissolved or removed in eight hours, whereas the coating with the overcoat cycled without any detectable change at the end of one month. Thus, the film without the tantalum oxide overlayer remained substantially durable to the acid, whereas the coating with the overcoat cycled in the acid without any detectable change at the end of one month.

Of course, it is understood that the above is merely a preferred embodiment of the invention and that various changes and alterations can be made without departing from the spirit and broader aspects thereof as set forth in the appended claims. For example, it is contemplated that other types of electrochromically-active materials and precursors therefor could be utilized within the broader aspects of the invention. Other methods of converting such materials might be utilized. Similarly, variations in the methods for removal of the precursor solution solvent and the selected moiety might be chosen. Whereas the preferred embodiment contemplates evaporation of the solvent by heating and/or evaporation in vacuum followed by removal of the moiety by further heating, it is conceivable that a moiety could be selected which is also evaporated in a vacuum, where the moiety's vapor pressure is such that a substantially greater vacuum is required to effect its removal than is required to effect removal of the precursor solution solvent. These variations are illustrations of changes and alterations which are within the broader aspects of the invention as set forth in the appended claims.

The exclusive property or privileges claimed are:

1. A method of forming an electrochromic coating on a substrate having an electrically conductive surface comprising:

providing a substrate having an electrically conductive surface;

providing a solution of an (1) electrochromic precursor, which can be converted to an electrochromic material, and (2) a removable moiety in (3) a carrier solvent;

said solvent, said moiety and said electrochromic precursor being selected such that said solvent is preferentially removed in a first removal step from a coating of said solution, leaving a matrix film of said electrochromic precursor and said moiety, and said moiety is preferentially removed from said matrix in a second removal step, prior to or during conversion of said electrochromic precursor to an electrochromic material;

coating the conductive surface of said substrate with said solution to form a coated substrate having a coating of a desired thickness;

removing said solvent from said coating in a first removal step to form an electrochromic precursor/moiety matrix film on said substrate;

performing a second removal step to remove moiety from said matrix; and converting said electrochromic precursor to an electrochromic material to form an electrochromic coating.

2. A method in accordance with claim 1 wherein the molar ratio of said moiety to said electrochromic precursor is from about 0.1:1 to about 2:1.

3. A method in accordance with claim 2 wherein the molar ratio of said organic moiety to said electrochromic precursor is from about 0.3:1 to about 1:1.

4. The method of claim 1 in which said electrochromic precursor is selected such that it is converted to an electrochromic material at an elevated conversion temperature;

said first removal step being conducted by one of (1) evaporating said solvent in a vacuum, (2) evaporating said solvent at an elevated first temperature which is below said conversion temperature at which said electrochromic precursor is converted to an electrochromic material, or (3) a combination of both; and said second removal step being conducted by heating said electrochromic precursor and moiety matrix to said conversion temperature at which said electrochromic precursor is converted to an electrochromic material.

5. The method of claim 4 in which said removable moiety is an organic moiety having a decomposition temperature greater than, or a vapor pressure sufficiently low at the temperature at which said solvent is removed, that said organic moiety and said electrochromic precursor form a matrix film on said substrate after said solvent evaporates, and said organic moiety having a decomposition temperature lower than, or a vapor pressure sufficiently high at said conversion temperature at which said electrochromic precursor is converted to an electrochromic material that said organic moiety is substantially removed from said coating before or during said conversion.

6. A method in accordance with claim 5 wherein said organic moiety has a carbon content of six carbon atoms or less per molecule.

7. A method in accordance with claim 6 wherein the molar ratio of said moiety to said electrochromic precursor is from about 0.1:1 to about 2:1.

8. A method in accordance with claim 7 wherein the molar ratio of said organic moiety to said electrochromic precursor is from about 0.3:1 to about 1:1.

9. A method in accordance with claim 7 wherein said organic moiety is selected from the group consisting of oxalic acid, malonic acid, succinic acid, glutaric acid, adipic acid, formamide and glycerol.

10. A method in accordance with claim 9 wherein said electrochromic precursor is selected to form a metallic oxide selected from the group of tungsten oxide, molybdenum oxide, manganese oxide, chromium oxide, rhenium oxide, iridium oxide, nickel oxide and mixtures thereof.

11. A method in accordance with claim 10 wherein said carrier solvent is selected from the group consisting of methanol, ethanol, propanol, isopropanol, sec-butanol and mixtures thereof.

12. The method of claim 11 in which said electrochromic precursor is a peroxyester-transition metal derivative.

13. The method of claim 12 in which said second removal step is conducted by heating to a temperature of from about 250° C. to about 400° C.

14. The method of claim 13 in which said second removal step is conducted by heating to a sufficiently high temperature to crystallize the resulting electrochromic coating.

15. The method of claim 7 in which said second removal step is conducted by heating to a temperature of from about 250° C. to about 400° C.

16. A method in accordance with claim 5 wherein the molar ratio of said moiety to said electrochromic precursor is from about 0.1:1 to about 2:1.

17. The method of claim 16 in which said second removal step is conducted by heating to a temperature of from about 250° C. to about 400° C.

18. A method in accordance with claim 5 wherein said second removal step comprises heating said coated substrate to said conversion temperature at a rate of from about 5° C. to about 10° C. per minute.

19. A method in accordance with claim 18 wherein said coated substrate is held at said conversion temperature for about 15 to about 120 minutes.

20. A method in accordance with claim 18 wherein said first removal step comprises heating said coated substrate from room temperature to said first elevated temperature at a rate of from about 5° C. to about 10° C. per minute.

21. The method of claim 4 in which said conversion is conducted by heating to a sufficiently high temperature to crystallize the resulting electrochromic coating.

22. A method in accordance with claim 21 wherein said electrochromic precursor is selected to form a metallic oxide selected from the group of tungsten oxide, molybdenum oxide, manganese oxide, chromium oxide, rhenium oxide, iridium oxide, nickel oxide and mixtures thereof.

23. A method in accordance with claim 4 in which said said first removal step is conducted by heating in a humid atmosphere.

24. A method in accordance with claim 23 wherein said first removal step includes holding said substrate in a humid atmosphere at about 100° C. for about one hour.

25. A method in accordance with claim 24 wherein said coated substrate is heated in said first removal step from room temperature to about 100° C. at a rate of from about 5° C. to about 10° C. per minute.

26. The method of claim 23 in which said removable moiety is an organic moiety having a decomposition temperature greater than, or a vapor pressure sufficiently low at the temperature at which said solvent is removed, that said organic moiety and said electrochromic precursor form a matrix film on said substrate after said solvent evaporates, and said organic moiety having a decomposition temperature lower than, or a vapor pressure sufficiently high at the temperature at which said electrochromic precursor is converted to an electrochromic material that said organic moiety is substantially removed from said coating before or during said conversion.

27. A method in accordance with claim 26 wherein the molar ratio of said moiety to said electrochromic precursor is from about 0.1:1 to about 2:1.

28. The method of claim 27 in which said second removal step is conducted by heating to a sufficiently high temperature to crystallize the resulting electrochromic coating.

29. The method of claim 27 in which said second removal step is conducted by heating to a temperature of from about 250° C. to about 400° C.

30. A method in accordance with claim 4 wherein said electrochromic precursor is selected to form a metallic oxide selected from the group of tungsten oxide, molybdenum oxide, manganese oxide, chromium oxide, rhenium oxide, iridium oxide, nickel oxide and mixtures thereof.

31. The method in accordance with claim 30 in which said precursor is formed by reacting a first transition metal with hydrogen peroxide and an organic acid to form a first metal-peroxy acid product, which is then reacted with a lower alcohol to form a first peroxyester-transition metal derivative; and by reacting a second transition metal with hydrogen peroxide and an organic acid to form a second transition metal-peroxy acid product, which is then mixed with said first peroxyester-transition metal derivative.

32. The method in accordance with claim 31 which further comprises the step of reacting said second transition metal-peroxy acid product with a lower carbon alcohol to form a second peroxyester-transition metal derivative prior to mixing with said first peroxyester-transition metal derivative.

33. The method of claim 1 which additionally includes covering said electrochromic coating with a layer of tantalum pentoxide, a proton conductor on a layer which is a lithium conductor.

34. A method in accordance with claim 33 wherein the molar ratio of said moiety to said electrochromic precursor is from about 0.1:1 to about 2:1.

35. The method of claim 34 in which said electrochromic precursor is selected such that it is converted to an electrochromic material at an elevated conversion temperature;

said first removal step being conducted by one of (1) evaporating said solvent in a vacuum, (2) evaporating said solvent at an elevated first temperature which is below said conversion temperature at which said electrochromic precursor is converted to an electrochromic material, or (3) a combination of both; and said second removal step being conducted by heating said electrochromic precursor and moiety matrix to said conversion temperature at which said electrochromic precursor is converted to an electrochromic material.

36. The method of claim 35 in which said removable moiety is an organic moiety having a decomposition temperature greater than, or a vapor pressure sufficiently low at the temperature at which said solvent is removed, that said organic moiety and said electrochromic precursor form a matrix film on said substrate after said solvent evaporates, and said organic moiety having a decomposition temperature lower than-, or a vapor pressure sufficiently high at said conversion temperature at which said electrochromic precursor is converted to an electrochromic material that said organic moiety is substantially removed from said coating before or during said conversion.

37. A method in accordance with claim 36 wherein said organic moiety has a carbon content of six carbon atoms or less per molecule.

38. An electrochromic coating on a substrate having an electrically conductive surface formed by:

providing a substrate having an electrically conductive surface;

providing a solution of an (1) electrochromic precursor, which can be converted to an electrochromic material, and (2) a removable moiety in (3) a carrier solvent;

said solvent, said moiety and said electrochromic precursor being selected such that said solvent is preferentially removed in a first removal step from a coating of said solution, leaving a matrix film of said electrochromic precursor and said moiety, and said moiety is preferentially removed from said matrix in a second removal step, prior to or during conversion of said electrochromic precursor to an electrochromic material;

coating the conductive surface of said substrate with said solution to form a coated substrate having a coating of a desired thickness;

removing said solvent from said coating in a first removal step to form an electrochromic precursor/moiety matrix film on said substrate;

performing a second removal step to remove moiety from said matrix; and converting said electrochromic precursor to an electrochromic material to form an electrochromic coating.

* * * * *

UNITED STATES PATENT AND TRADEMARK OFFICE
CERTIFICATE OF CORRECTION

PATENT NO. : 5,277,986
DATED      : January 11, 1994
INVENTOR(S): John P. Cronin, Anoop (NMI) Agrawal, Daniel J. Tarico, and Juan Carlos L. Tonazzi It is certified that error appears in the above-indentified patent and that said Letters Patent is hereby corrected as shown below:

Column 7, line 52:

"10020C." should be --100° C.--;

Column 16, line 54;

"than-" should be --than,--.

Signed and Sealed this

Eighteenth Day of October, 1994

Attest:

BRUCE LEHMAN

Attesting Officer      Commissioner of Patents and Trademarks

UNITED STATES PATENT AND TRADEMARK OFFICE
CERTIFICATE OF CORRECTION

PATENT NO. : 5,277,986
DATED : January 11, 1994
INVENTOR(S) : John P. Cronin, et al It is certified that error appears in the above-indentified patent and that said Letters Patent is hereby corrected as shown below:

Title Page, Inventors:

"Raymond L. Zhang" should read --Juan Carlos L. Tonazzi--

Signed and Sealed this

Twenty-seventh Day of December, 1994

Attest:

BRUCE LEHMAN

Attesting Officer     Commissioner of Patents and Trademarks